F. ZEMLA.
TIRE INFLATING DEVICE.
APPLICATION FILED JUNE 20, 1921.

1,438,284.

Patented Dec. 12, 1922.
2 SHEETS—SHEET 1.

Inventor
F. Zemla
By J. K. Bryant
Attorney

F. ZEMLA.
TIRE INFLATING DEVICE.
APPLICATION FILED JUNE 20, 1921.
1,438,284.
Patented Dec. 12, 1922.
2 SHEETS—SHEET 2.
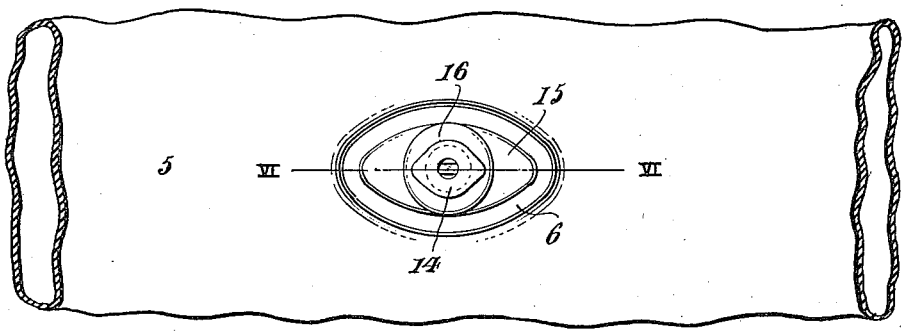
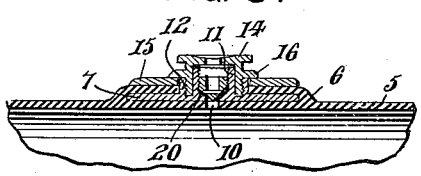
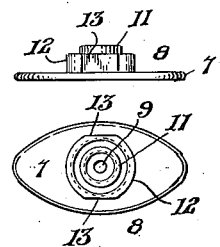
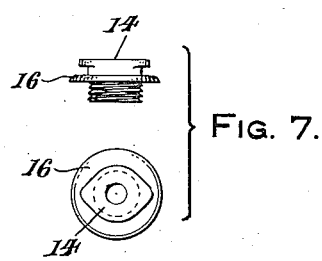
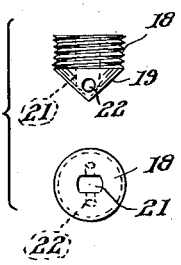
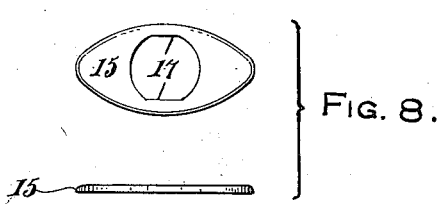
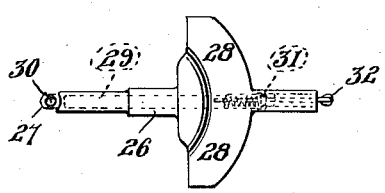
Inventor
F. Zemla
By J. K. Bryant.
Attorney Patented Dec. 12, 1922.

1,438,284

UNITED STATES PATENT OFFICE.

FRANK ZEMLA, OF HAMTRAMCK, MICHIGAN.

TIRE-INFLATING DEVICE.

Application filed June 20, 1921. Serial No. 479,001.

*To all whom it may concern:*

Be it known that I, FRANK ZEMLA, a citizen of Poland, residing at Hamtramck, in the county of Wayne and State of Michigan, have invented certain new and useful Improvements in Tire-Inflating Devices, of which the following is a specification.

This invention relates to certain new and useful improvements in tire inflating devices and has particular reference to an improved means for inflating pneumatic tubes of vehicle tires which will avoid the necessity of the objectionable valve stems projecting inwardly through the rim and felly as is now the case.

The primary object of the invention is to avoid the use of the inwardly projecting valve stems by means of a simple, durable and efficient combination of devices adaptable either to the tires of the double tube type or the single tube type and capable of being readily and easily employed by relatively unskilled persons.

Broadly, the invention contemplates a valve casing adapted to be attached to the inflatable tube so that a neat appearance will be presented from the exterior thereof and so that the stem will be devoid of projecting parts when the tire is in use, the valve casing embodying an internal valve member, and a detachable combination valve stem and valve releasing key being adapted for engagement with the valve of the casing for unseating the latter valve when it is desired to inflate the tire.

Other objects will appear as the nature of the invention is better understood, and the same consists in the novel form, combination and arrangement of parts hereinafter more fully described in connection with the accompanying drawings, and in which like reference characters indicate corresponding parts throughout the several views.

Figure 1:
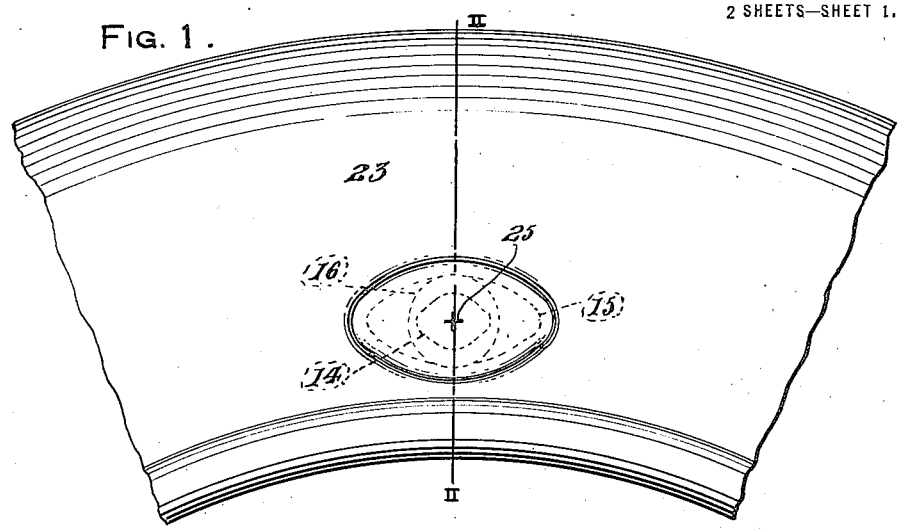
Figure 1 is a fragmentary elevational view of a tire of the double tube type equipped with an inflating device constructed in accordance with the present invention.
Figure 2:
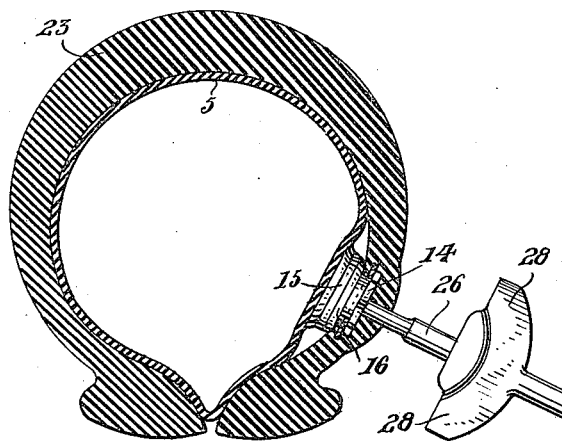
Figure 2 is a radial section taken upon line II—II of Figure 1 and with the combination key and valve stem in place.
Figure 4:
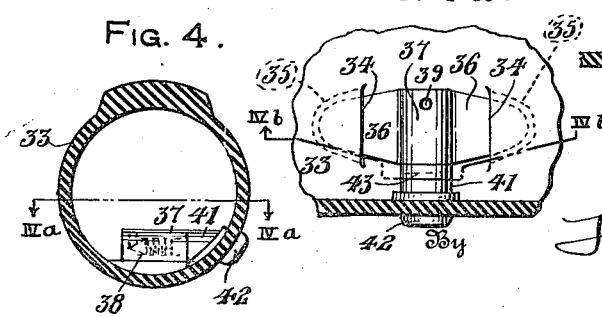
Figure 4 is a view similar to Figure 2 of a modified form of the invention which is particularly adapted to tires of the single tube type such as are commonly employed upon bicycles.
Figure 4:
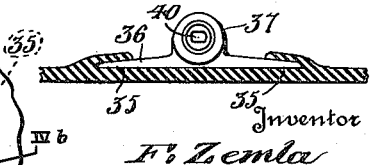

Figure 4$^a$ is a sectional view taken upon line IV$^a$—IV$^a$ of Figure 4 and drawn on a larger scale, Figure 4$^b$ is a sectional view along line IV$^b$—IV$^b$ of Figure 4$^a$, Figure 5 is a fragmentary elevational view of the inner tube employed in the casing of Figures 1 and 2, Figure 6 is a longitudinal sectional view taken on line VI—VI of Figure 5, Figure 7 shows the removable valve cap of the device shown in Figure 6, in side elevation and plan views, Figure 8 shows the removable attaching plate of the device shown in Figure 6 in plan and side elevational views, Figure 9 shows a base member of the valve casing of Figure 6 in side elevation and plan views, Figure 10 shows the valve member per se employed in the structure of Figure 6, in side elevation and plan views, and Figure 11 is a side view of the removable combined stem valve key employed with the devices of Figures 2 and 4.

Figure 3:
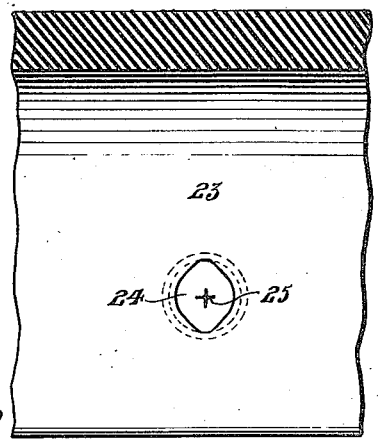
Figure 3 is a fragmentary elevational sectional view taken through the casing of the tire shown in Figure 1 with the inner tube removed.

Referring more in detail to the several views, the present invention, as applied to tires of the double tube type and as shown in Figures 1 to 3 inclusive and 5 to 11 inclusive, embodies an inner tube 5 of any preferred or usual form thickened at one side as at 6 and having the elongated base plate 7 of a valve casing 8 embedded in this thickened portion, the base plate being provided with a central opening 9 alined with a similar opening 10 provided in the tube. The valve casing embodies a pair of concentric sleeves 11 and 12 integral with and projecting from the plate 7 concentric with and about the opening 10, the sleeves 11 and 12 being internally threaded, and opposite sides of the sleeve 12 being flat as at 13. A cap 14 is threaded into the sleeve 12, while a detachable fastening plate 15 is fitted onto the sleeve 12 and held in place by means of an annular flange 16 provided on the cap 14, the plate 15 being provided with a central opening with flat sides as at 17 which cooperate with the flat sides 13 of the sleeve 12 for preventing relative rotary movement between these parts. A threaded valve member 18 is screwed into the sleeve 11 and has a conical inner end as at 19 for seating upon a conical valve seat provided interiorly of the sleeve 11 as at 20, the valve member being provided with a central opening extending from its outer end as at 21 to a transverse opening 22 which extends through the tapered end portion of said valve member. Thus, when the valve member is unseated, communication is had between the atmosphere and the interior of the tube 5 through the openings in the cap 14, the plate 7 and tube 5 by way of the longitudinal opening of passage 21 and transverse passage 22 of the valve member 18, while when the latter is seated, the transverse passage 22 is closed for retaining air under pressure within the tube.

The valve cap 14 is provided exteriorly of the tube 5 and the same is provided with an elongated head presenting opposite flanges as clearly shown in Figure 7, while the interior of the tire casing 23 is provided with an undercut recess 24 whose entrance opening is of similar form to the head of the cap 14 so that when said head is admitted and turned at right angles, the tube and casing are effectively connected so that the opening of the cap 14 registers with an opening or normally closed slit provided centrally of the recess 24 in the casing as at 25.

A hollow valve stem 26 having an end portion 27 of angular form for fitting the angular longitudinal passage 21 of the valve member 18 is provided for insertion through the slits 25 of the tire casing 23 for screwing and unscrewing the valve member 18 to and from its seat, the valve stem being provided with wings 28 for facilitating turning of said valve member. The valve stem is provided with a longitudinal passage as at 29 opening at the outer end of said stem and communicating with a transverse opening 33 at the inner end of the stem, the passage through the latter being normally closed by a spring seated valve 31 having a projecting stem 32 which may be manually forced inwardly in the usual manner and also which may be forced inwardly by air pressure for unseating the valve 31 when inflating the tube 5, the outer end of the valve stem being adapted for reception of the usual coupling of an air supply hose. Thus, when desiring to inflate the tube 5, the stem 26 is inserted through the slits 25 so that the end portion 27 of the valve stem engages the passage 21. The valve stem is then rotated in one direction for unseating the valve member 18 and when the usual supply hose is coupled to the outer end of the valve stem, the valve 31 is forced to an unseated position for admitting air to the interior of the tube 5. When the tube is properly inflated, the supply hose is disconnected from the valve stem and the air pressure is maintained within the tube 5 by seating of the valve 31 automatically. The valve stem is then rotated for seating the valve member 18 and then said valve stem is removed for permitting use of the tire without any objectionable projecting parts such as the valve stems which are now permanently attached to inner tubes. In the form of the invention shown in Figures 4, 4$^a$ and 4$^b$, wherein adaptation of the invention to the single tube type of tire is illustrated, the usual pneumatic tire 33 is internally slit transversely as at 34 at spaced points and undercut to provide opposed pockets or an undercut recess as at 35 within which the ends of a base plate 36 are seated, the base plate 36 being preferably of elongated form and having an integral transverse tubular valve casing 37 within which a threaded valve member 38 is secured, the valve member 38 being similar in form to the form of the valve member 18 above described in connection with Figures 10, etc., the valve member 38 being adapted to seat at the inner end of the valve casing 37 when screwed inwardly to cover a transverse inlet port 39 provided through the valve casing 37, and being adapted to permit inlet of air through the passage 39 when screwed outwardly of the casing 37, the longitudinal passage 40 of the valve member 38 being shaped for reception of the inner end 27 of the valve stem 26. The valve casing 37 is extended laterally of the base plate 36 in one direction relative to the base plate 36 to provide a tubular portion 41 which extends in proximity to the adjacent side portion of the tire 33, and a centrally apertured rubber plug member 42 is rigidly fastened to extend through said tire by being vulcanized in the latter so that a tubular portion 43 of said plug telescopes within the extension 41 of the valve casing 37, the central aperture of the plug 42 being adapted for reception of the inner end of the valve stem 26 whereby said valve stem may be engaged with the valve member 38 for admitting air to the tire in substantially the same manner as hereinbefore described with respect to the form of the invention applied to tires of the double tube type.

It will also be seen that the form of the invention with respect to the single tube type of tire presents a neat appearance and provides no projecting permanent members on the tire such as the valve stems and the like, while a simple and practical means is provided for permitting the ready inflation of the tire.

From the foregoing description, it is believed that the construction and operation as well as the advantages of the present invention will be readily understood and appreciated by those skilled in the art.

Minor changes may be made without departing from the spirit and scope of the invention as claimed.

What is claimed as new is:

The combination with a pneumatic tire shoe and inner tube, of a sectional valve structure connecting the shoe and tube at a point spaced from the shoe bead, said valve structure including a base plate adapted to be received within an undercut recess in the outer face of the tube, said recess being provided with an opening communicating with the interior of the tube, the said base plate having a central opening therethrough in alinement with the opening in said tube, a valve housing formed upon said base plate and adapted to receive a valve therein for normally maintaining closed the opening in said tube and base plate, means detachably positioned upon said valve housing for retaining said base plate in position within the said recess of the tube and also adapted to engage within an undercut recess in the inner surface of the tire shoe, and a combined valve stem and key for seating and unseating said valve member for insertion through an opening in the tire shoe coincident with said valve member and adapted for connection with an air supply hose at its outer end.

In testimony whereof I affix my signature in presence of two witnesses.

FRANK ZEMLA.

Witnesses:
  MARIE TYSZKA,
  CHAS. LORASSBERG.